United States Patent [19]

Sander

[11] Patent Number: 4,779,968
[45] Date of Patent: Oct. 25, 1988

[54] COAXIAL ILLUMINATING SYSTEM FOR OPERATION MICROSCOPES

[75] Inventor: Ulrich Sander, Oberkochen, Fed. Rep. of Germany

[73] Assignee: Carl-Zeiss-Stiftung, Heidenheim on the Brenz, Fed. Rep. of Germany

[21] Appl. No.: 71,331

[22] Filed: Jul. 9, 1987

[51] Int. Cl.$^4$ .................. G02B 21/04; G02B 21/06
[52] U.S. Cl. .................. 350/527; 350/520; 350/528
[58] Field of Search ............... 350/523, 525, 527, 528, 350/520

[56] References Cited

U.S. PATENT DOCUMENTS

| | | | |
|---|---|---|---|
| 3,421,806 | 1/1969 | Weber | 350/527 |
| 3,574,440 | 4/1971 | Dertina et al. | 350/527 |
| 3,918,793 | 11/1975 | Kraft | 350/527 |
| 3,973,827 | 8/1976 | Uetake | 350/527 |
| 4,027,944 | 6/1977 | Gottlieb | 350/527 |
| 4,505,555 | 3/1985 | Piller et al. | 350/527 |

FOREIGN PATENT DOCUMENTS 57-211109(A) 12/1982 Japan .................. 350/527
468206 7/1975 U.S.S.R. .................. 350/527

Primary Examiner—John K. Corbin
Assistant Examiner—Martin Lerner
Attorney, Agent, or Firm—Stonebraker, Shepard & Stephens

[57] ABSTRACT

In an operation microscope, an illumination beam or ray is projected from a lateral position toward the main optical axis or observation axis, to intersect the observation axis at a point below the main objective of the microscope. At this point of intersection, a beam splitter element (plate or cube) reflects the illumination beam downwardly along the observation axis, toward the object or specimen being examined, while allowing the observation rays to pass along the observation axis. This allows the object to be examined under truly coaxial illumination, which is especially useful for certain types of examination or operation upon the eye. The beam splitter and other parts may be mounted in a housing which may be swung aside when coaxial illumination is not wanted. In a disclosed variation, provision is made for combined coaxial and oblique illumination of the object.

18 Claims, 2 Drawing Sheets

COAXIAL ILLUMINATING SYSTEM FOR OPERATION MICROSCOPES

This invention relates to a coaxial illuminating system for operation microscopes which have a common principal objective for the two observation ray paths, and the illumination ray path of which is introduced perpendicularly to the optical axis of the principal objective and is reflected in a direction toward the object by a first reflection element.

Operation microscopes are known, in which there is a common principal objective for the two observation ray paths, and in which the illumination ray path, coming from an illuminating system, is introduced in a direction perpendicular to the optical axis of the principal objective and is reflected in a direction toward the object by a first reflection element. An example of such a microscope is the one described in Prospectus 30-311.0-e Scho. I/69 of the Carl Zeiss firm, of West Germany. A so-called coaxial illuminating system for such operation microscopes is disclosed in Federal Republic of Germany Pat. No. 34 27 592 A1. This known illuminating system for operation microscopes has the disadvantage that for the divided microscope principal objective intended for this microscope, a new optical construction series is necessary, and that, strictly speaking, it constitutes a paraxial illuminating system, rather than a truly coaxial system.

An important object of the invention is to provide, for operation microscopes, an improved illuminating system or device which is truly coaxial.

Another object is to provide a coaxial illuminating device which, in particular, permits optimal fundus regression.

A further object is to provide an improved coaxial illuminating system for operation microscopes, of simple construction and so designed that it may be attached as an accessory to existing operation microscopes.

SUMMARY OF THE INVENTION

In order to obtain optimal fundus regression when examining or operating on the anterior media of the eye, it is necessary to illuminate the part of the retina which one could observe upon the compensating of the refractive power of the optically active media of the eye.

This is done, according to the present invention, by providing means whereby the optical axes of the reflected illumination ray path and those of the observation ray paths passing through the principal objective pass through a beam splitter element at a point which lies on the optical axis of the observation ray paths. For this purpose, the illumination ray path is preferably reflected below the principal objective by a second reflection element onto the beam splitter element. The beam splitter element may consist, for instance, of a beam splitter plate or of a beam splitter cube.

In one advantageous embodiment of the invention, the illumination device is provided with a stop which is located in a plane which is conjugated to the plane of the retina of the patient's eye. Because the central part of the illumination pupil may be masked out by this stop, the macula of the eye of the patient is not illuminated, and thus is protected from damage. In this plane, there may also be provided a stop which has a central opening so that the diameter of the illumination pupil may be limited to the desired dimension. This type of stop is required as a central fixation object for radial keratotomy.

In order to eliminate disturbing reflected light, light traps are provided behind the beam splitter element. These traps are conveniently developed as light-absorbing blackened bodies.

The second reflection element, the beam splitter element, and the light trap or traps are preferably arranged in fixed position in a housing which is swingable about an axis, to an effective operating position below the principal objective, and to at least one position which does not interfere with the observation ray path.

The advantages of the present invention include, in particular, the fact that with the coaxial illuminating system or device of the invention, the surgeon is able to obtain a regressive illumination such as is required for microsurgery on the eye. This is especially important for cataract operations in which residues of the lens of the eye which may have remained on the lens capsule must be detected. In the paraxial illuminating devices used heretofore, an angle of at least three degrees is still present between the axis of the observation beam and the axis of the illumination beam. With the truly coaxial illuminating device of the present invention, these two axes coincide, so the angle between them is zero degrees. As a result, the regression and the intensity of the light reflected by the fundus of the eye are optimized, and this is accomplished with reduced discomfort for the patient and regardless of the position and tilt of the eye to be treated.

BRIEF DESCRIPTION OF THE DRAWINGS

In the accompanying drawings, which show an illustrative embodiment of the invention.

DETAILED DESCRIPTION

Figure 1:
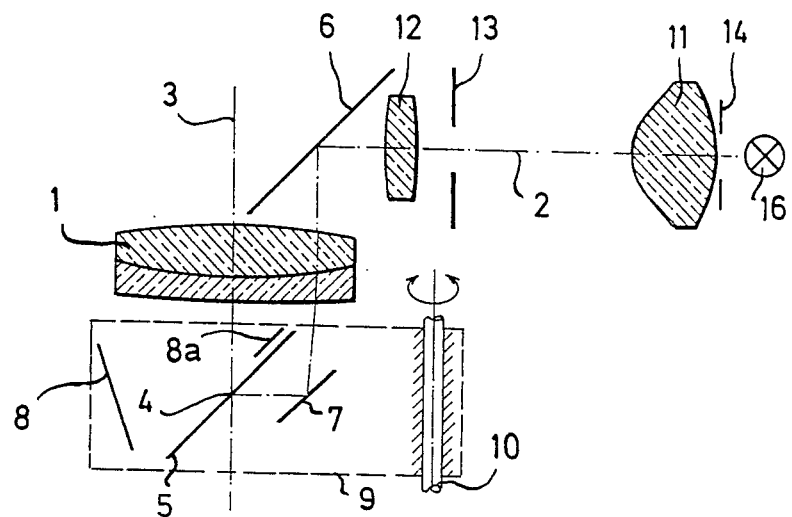
FIG. 1 is a schematic diagram of an illuminating system according to a preferred embodiment of the invention.

The construction of the operation microscope, except for the coaxial illumination system of the present invention, is conventional, and so is not illustrated. The details of the microscope may be widely varied without affecting the invention. The microscope includes the usual main or principal objective, indicated schematically at 1 in FIGS. 1 and 3. The optical axis 3 (FIG. 1) of this objective is also the optical axis of the observation ray path, as will be readily understood by those familiar with conventional operation microscopes.

The illumination system or device comprises a source of light 16, light from which is projected through the collector lenses 11 and 12 along an illumination ray path 2 to a reflection element 6. Here, the illumination ray is reflected downwardly, through the principal objective 1, approximately parallel to but offset from the observation optical axis 3, to a second reflection element 7. This element 7 reflects the illumination ray laterally to the beam splitter element 5, which reflects the illumination ray or beam into the observation axis 3, downwardly toward the object (not shown) such as the human eye on which the microscope is focussed.

It will be noted that the beam splitter's reflecting surface intersects the main or observation optical axis 3 at the same point where the axis of the illumination beam 2 intersects the axis 3 after being reflected toward the axis 3 by the element 7. Thus it is assured that from the beam splitter 5 downward toward the object being observed, the illumination ray or beam is truly coaxial to the observation ray or beam, rather than being paraxial and at a slight angle to the observation axis.

Diaphragms or stops 13 and 14 are preferably provided in the illumination ray path, as illustrated in FIG. 1. These stops may be of any known or conventional kind or form, and may, for example, limit the diameter of a central ray of light (e.g., a conventional adjustable iris diaphragm) or, on the contrary, block a central core and pass a ring of light. Also, one of the stops may be located in a position which is conjugated with respect to the object being observed or operated upon.

Light traps 8 and 8a are provided, to eliminate disturbing reflected light. As above mentioned, these traps may be in the form of black light-absorbing members.

In a preferred embodiment of the invention, the second reflection element 7, the beam splitter 5, and the light traps 8 and 8a are all mounted in fixed position in a housing 9 which is mounted to swing on an axis which is parallel to the main optical axis 3. The swing axis is conveniently formed by a stud fastened to a bracket fixed to the conventional frame of the microscope, and the bracket is so formed (in any convenient or conventional manner) that it may be attached to existing microscopes. Thus the invention may be used as an accessory to existing microscopes, and is not necessarily included in the original construction of the microscope.

Figure 2:
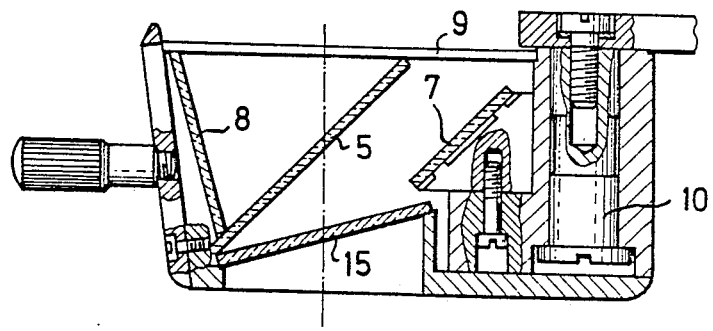
FIG. 2 is a sectional view through an adapter housing which may be swung into and out of an effective operating position in front of (below) the operation microscope, showing certain optical elements mounted within this housing.

FIG. 2 shows this swingable construction in more physical detail than the schematic showing in FIG. 1. The parts have the same reference numerals, so the description need not be repeated. The top of the housing 9 is either open or transparent, so that the observation rays or beams along the axis 3 and the illumination rays or beams along the axis 2 may enter the top. The bottom of the housing may have an open window in line with the axis 3, or the window may be closed by a transparent member 15. The housing is shown in its effective operating position in FIG. 1. It may be swung aside, on the axis or pivot 10, to an ineffective or nonoperating position where it is not beneath the main objective 1. If desired, the illumination beam may then be projected through the objective 1 as a paraxial illumination ray, at a slight angle to the observation axis 3, if such illumination is desired for special situations.

Figure 3:
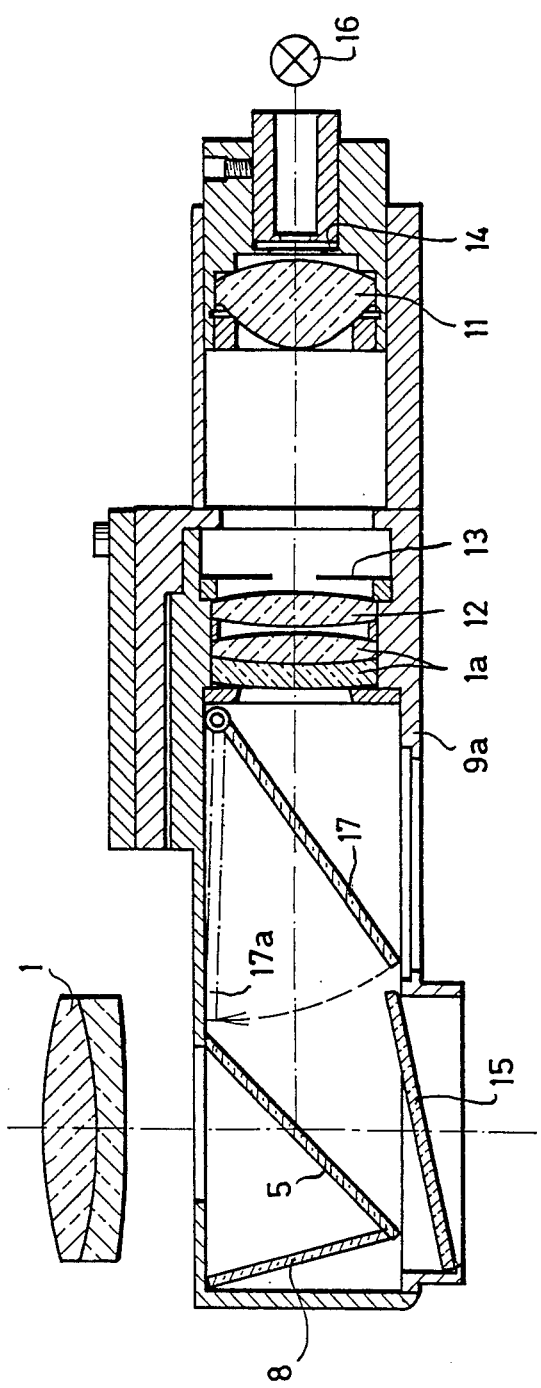
FIG. 3 is a sectional view of an adapter for coaxial illumination with an integrated illumination system, according to another embodiment of the invention.

FIG. 3 illustrates another embodiment of the invention, where the illumination system is entirely below the principal objective 1 and the illumination ray does not pass through the principal objective.

In this embodiment, the same reference numerals are used for corresponding parts as in FIGS. 1 and 2, but the parts are arranged somewhat differently. Light from the source 16 passes through the collector lenses 11 and 12, along a straight path to the beam splitter 5 which, as before, is located at the intersection of the illuminating ray axis with the main optical axis (the observation ray axis) so that the illumination ray, when it reaches the object, will be truly coaxial, just as in the first embodiment. The reflections by the first and second reflecting elements 6 and 7 of the first embodiment are eliminated in this embodiment in FIG. 3. Because the illuminating ray does not pass through the main objective 1 in this embodiment, an illuminating objective 1a is provided.

A hinged mirror 17 is also provided. When this is swung up to the position shown in dashed lines, it does not intersect the illumination ray path, and coaxial illumination occurs. When the mirror is swung down to the position shown in full lines, it intercepts the illumination beam and reflects it downwardly to the object, through a window in the housing 9a below the mirror, so that the eye of the patient may be examined by oblique illumination. The mirror may be made partially transmitting and partially reflecting, instead of totally reflecting, so that some of the illuminating beam will pass through the mirror 17 and be reflected coaxially into the main optical axis by the beam splitter 5. Thus the eye may be examined and/or operated upon under simultaneous coaxial and oblique illumination.

Other parts, such as the diaphragms or stops 13, 14, the light trap 8, and the transparent window 15, may be the same as the correspondingly numbered parts in the first embodiment, and require no further description. Also, the housing 9a in this embodiment may be mounted to swing into and out of effective position beneath the main objective 1, just as in the first embodiment.

What is claimed is:

1. A coaxial illumination device for an operation microscope of the type wherein a main objective has an optical axis which constitutes an observation ray axis, said illumination device comprising a source of light, optical means for projecting light from said source along an illumination ray path intersecting said observation ray axis substantially perpendicularly thereto at a point between said main objective and an object being observed through said microscope, and a beam splitter element located at the intersection of said observation ray axis and said illumination ray path, said beam splitter element being arranged to pass observation rays from said object through said beam splitter element to said main objective and to receive illumination rays projected to said beam splitter element along said illumination ray path and reflect the received rays coaxially along said observation ray axis toward said object being observed, said optical means including a first reflection element (6) located behind said main objective and positioned to cause light passing along said illumination ray path to pass through said main objective along a path approximately parallel to but offset laterally from said optical axis of said main objective.

2. The invention defined in claim 1, wherein said optical means includes a second reflection element (7) located in front of said main objective and positioned to receive light passed through said main objective from said first reflection element and cause such light to pass substantially along an axis intersecting said observation ray axis.

3. The invention defined in claim 1, wherein said optical means includes a second reflection element (7) for receiving an illumination ray reflected by said first reflection element and reflecting such ray onto said beam splitter element.

4. The invention defined in claim 3, further comprising a housing (9) swingable on an axis (10), said second reflection element (7) and said beam splitter element (5) being mounted in fixed position within said housing, said housing being swingable from a first position wherein said beam splitter element intersects said observation ray axis in a position below said main objective to a second position wherein said beam splitter element and said housing are in non-intersecting and non-obstructing relation to said observation ray axis.

5. The invention defined in claim 1, wherein said beam splitter element comprises a beam splitter plate.

6. The invention defined in claim 1, wherein said beam splitter element comprises a beam splitter cube.

7. The invention defined in claim 1, further comprising optical stop means located in said illuminating ray path in a plane conjugated to the plane of a retina of an eye being examined by said microscope.

8. The invention defined in claim 7, wherein said stop means limits the diameter of an illumination pupil of light in said illumination ray.

9. The invention defined in claim 7, wherein said stop means darkens a central region of a beam of light constituting said illuminating ray.

10. The invention defined in claim 1, further comprising light trap means associated with said beam splitter element to reduce disturbing reflections.

11. The invention defined in claim 10, wherein said light trap means comprises light absorbing members.

12. The invention defined in claim 1, further comprising a housing (9a) adapted to be attached to said microscope below said main objective, said optical means for projecting light along said illumination ray path being mounted in said housing and including a supplementary objective (1a) in said illumination ray path.

13. The invention defined in claim 12, wherein said beam splitter element also is mounted in said housing.

14. The invention defined in claim 13, wherein said housing is mounted for swinging from a first position in which said beam splitter element and said illumination ray path intersect said observation ray axis, to a second position in which said beam splitter element is in non-intersecting and non-obstructing relation to said observation ray axis.

15. The invention defined in claim 13, further comprising a hinged mirror (17) mounted in said housing for movement from a first position intersecting said illumination ray path at a distance from said beam splitter element to a second position in non-intersecting relation to said illumination ray path, said hinged mirror being so placed that when it is in its said first position it will cause light approaching along said illumination ray path to be reflected toward said object being observed, at an angle to said observation ray axis, so that said object may be observed under oblique illumination.

16. The invention defined in claim 15, wherein said hinged mirror is partially reflecting and partially transmitting, so that when said mirror is in its said first position, said object may be observed under combined coaxial and oblique illumination.

17. An attachment for an operation microscope to facilitate illumination of an object by light impinging on said object coaxially with an observation axis, said microscope including a main objective having an optical axis coaxial with said observation axis, said attachment comprising a housing adapted to be attached to said microscope in a position below said main objective, a beam splitter element mounted in said housing in a position intersecting said observation axis, and means for projecting an illumination beam along an illumination path, part of said illumination path lying within said housing and extending therein in a direction toward said beam splitter element in a position to intersect said observation axis at substantially the same point at which said beam splitter element intersects said observation axis, said beam splitter element being positioned and arranged to pass observation rays through said element along said observation axis and to reflect an incoming illumination beam downwardly toward said object along said observation axis coaxially therewith, said housing containing a reflection element (7) spaced from said beam splitter element (5), a portion of said illumination path along which said illumination beam is projected lying outside of said housing and extending in a direction generally parallel to said observation axis (3) and passing through said main objective (1) in a position laterally offset from said observation axis and impinging on said reflection element, said reflection element being positioned and arranged to reflect an incoming illumination beam toward said beam splitter element.

18. The invention defined in claim 17, wherein said housing is mounted for swinging from a first position in which said beam splitter element intersects said observation axis to a second position wherein said beam splitter element is in non-intersecting relation to said observation axis.

* * * * *

UNITED STATES PATENT AND TRADEMARK OFFICE
CERTIFICATE OF CORRECTION

PATENT NO.   : 4,779,968
DATED        : Oct. 25, 1988
INVENTOR(S)  : Ulrich Sander It is certified that error appears in the above-identified patent and that said Letters Patent is hereby corrected as shown below:

In the heading of the patent, add the following:

[30]   Foreign Application Priority Data

July 12, 1986    [DE]   Fed. Rep. of Germany    3623613

Signed and Sealed this

Seventh Day of March, 1989

*Attest:*

DONALD J. QUIGG

*Attesting Officer*    *Commissioner of Patents and Trademarks*